(12) United States Patent
Lee et al.

(10) Patent No.: US 9,480,070 B1
(45) Date of Patent: Oct. 25, 2016

(54) BEARER DATA POWER BOOSTING IN A WIRELESS COMMUNICATION SYSTEM

(71) Applicant: Sprint Spectrum LP, Overland Park, KS (US)

(72) Inventors: Kyounghwan Lee, Newark, DE (US); Karan Raj Sachdev, Austin, TX (US); Vijendrakumar Ashiwal, Pittsburgh, PA (US); Andrzej Osinski, Ashburn, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 264 days.

(21) Appl. No.: 14/015,899

(22) Filed: Aug. 30, 2013

(51) Int. Cl.
*H04B 7/00* (2006.01)
*H04W 72/08* (2009.01)

(52) U.S. Cl.
CPC .................. *H04W 72/082* (2013.01)

(58) Field of Classification Search
CPC .................................................. H04W 16/32
See application file for complete search history.

(56) References Cited

U.S. PATENT DOCUMENTS

| | | | |
|---|---|---|---|
| 2004/0090935 A1* | 5/2004 | Courtney | H04W 36/12 370/331 |
| 2010/0173612 A1* | 7/2010 | Khanfouci | H04W 16/16 455/412.1 |
| 2012/0178482 A1* | 7/2012 | Seo | H04W 56/00 455/501 |
| 2012/0236731 A1 | 9/2012 | Beaudin | |
| 2013/0310059 A1* | 11/2013 | Parkvall | H04W 72/0446 455/452.1 |
| 2013/0322374 A1* | 12/2013 | Cai | H04W 52/244 370/329 |
| 2014/0073368 A1* | 3/2014 | Teyeb | H04W 72/082 455/501 |
| 2014/0133419 A1* | 5/2014 | Nagata | H04W 72/1257 370/329 |

* cited by examiner

*Primary Examiner* — Mohammed Rachedine

(57) ABSTRACT

In systems and methods of transmitting information to a wireless device, information is received at a first access node from a second access node over a communication link between the first and second access nodes, the information comprising an indication of whether the transmission of a resource block at the first access node may cause interference with a transmission at the second access node. The first access node transmits the resource block when it is determined that the transmission at the first access node will not interfere with a transmission at the second access node.

13 Claims, 6 Drawing Sheets

BEARER DATA POWER BOOSTING IN A WIRELESS COMMUNICATION SYSTEM

TECHNICAL BACKGROUND

Increasing the transmit power of a signal from an access node to one or more wireless devices is one way of improving the robustness of the signal. The additional transmit power can be reallocated from unused wireless communication resources, such as resource blocks, and the like. However, increasing the transmit power of a signal at one access node can also cause interference with the transmission of a signal at a proximate or neighboring access node. Such signal interference can degrade the transmission of information from the neighboring access node, and can have a negative impact on voice, data, and other services provided by the neighboring access node.

OVERVIEW

In an embodiment, information is received at a first access node from a second access node over a communication link between the first and second access nodes, the information comprising an indication of a duration during which a resource block will not be used by the second access node. An increased transmit power at the first access node for the resource block is determined. In addition, a transmit time at the first access node for the resource block is determined. When the transmit time corresponds with the duration, the resource block is transmitted from the first access node at the transmit time using the increased transmit power.

In an embodiment, information is received at a first access node from a second access node, the information comprising an indication of a duration during which a resource block will be used by the second access node. An increased transmit power at the first access node for the resource block is determined. When the increased transmit power meets a transmit power criteria, the resource block is transmitted from the first access node during the duration using the increased transmit power.

DETAILED DESCRIPTION

Figure 1:
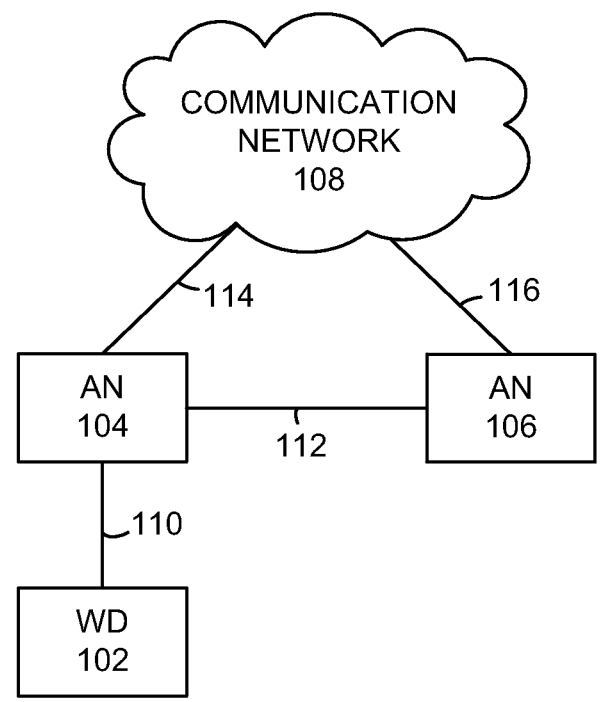
FIG. 1 illustrates an exemplary communication system to transmit information to a wireless device.

FIG. 1 illustrates an exemplary communication system 100 to transmit information to a wireless device comprising wireless device 102, access node 104, access node 106, and communication network 108. Examples of wireless device 102 can comprise a cell phone, a smart phone, a computing platform such as a laptop, palmtop, or tablet, a personal digital assistant, or an internet access device, including combinations thereof. Wireless device 102 is in communication with access node 104 over communication link 110.

Access nodes 104 and 106 are each a network node capable of providing wireless communications to a wireless device (such as wireless device 102), and can be, for example, a base transceiver station, a radio base station, an eNodeB device, or an enhanced eNodeB device. Access node 104 is in communication with communication network 108 over communication link 114, and access node 106 is in communication with communication network 108 over communication link 116. Further, access nodes 104 and 106 can communicate with each other over communication link 112. An example of communication link 112 is an X2 communication link.

Communication network 106 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 106 can be capable of carrying voice information and other data, for example, to support communications by a wireless device such as wireless device 102. Wireless network protocols may comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Worldwide Interoperability for Microwave Access (WiMAX), and Third Generation Partnership Project Long Term Evolution (3GPP LTE). Wired network protocols that may be utilized by communication network 106 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 106 may also comprise a wireless network, including base stations, wireless communication nodes, telephony switches, internet routers, network gateways, computer systems, communication links, or some other type of communication equipment, and combinations thereof.

Communication links 110, 112, 114 and 116 can be wired or wireless communication links. Wired communication links can comprise, for example, twisted pair cable, coaxial cable or fiber optic cable, or combinations thereof. Wireless communication links can comprise a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Other network elements may be present in communication system 100 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication between access node 104, access node 106 and communication network 108 which are omitted for clarity, including additional processing nodes, routers, gateways, and physical and/or wireless data links for carrying data among the various network elements.

To improve signal robustness, a signal can be transmitted from an access node with an increased transmit power. The increased transmit power can be applied to a resource element of a transmission, such as a resource block. However, the increased transmit power can cause interference with signal of neighboring access nodes. In an embodiment, a resource block can comprise a unit of resources which is able to be scheduled for transmission. For example, in the Long Term Evolution (LTE) standard, a resource block comprises 12 consecutive sub-carriers, typically spanning 180 kHz, for the duration of one slot (typically 0.5 ms). A resource block may be the smallest unit of resources able to be scheduled for transmission. Other standards and/or protocols may define such units in a different manner, with equivalent function.

In operation of an embodiment, information is received at access node 104 from access node 106 over communication link 112. Communication link 112 can be a link which enables the transmission of information from one access node to another access node without the involvement of additional network elements, though it will be understood that network components such as routers, etc. may be required to convey the information from the first access node to the second access node. The information can comprise an indication of a duration during which a resource block will not be used by access node 106. An increased transmit power at access node 104 for the resource block is determined. In addition, a transmit time at access node 104 for the resource block is determined. When the transmit time corresponds with the duration, the resource block is transmitted from access node 104 at the transmit time using the increased transmit power, to enable the transmission of the resource block by access node 104 while avoiding interference with signals transmitted by access node 106.

In operation of another embodiment, access node 104 receives information from access node 106 comprising an indication of a duration during which a resource block will be used by access node 106. An increased transmit power is determined for transmission of the resource block at access node 104. When the increased transmit power meets a transmit power criteria, the resource block is transmitted from access node 104 during the duration using the increased transmit power, to enable the transmission of the resource block by access node 104 while avoiding interference with signals transmitted by access node 106.

Figure 2:
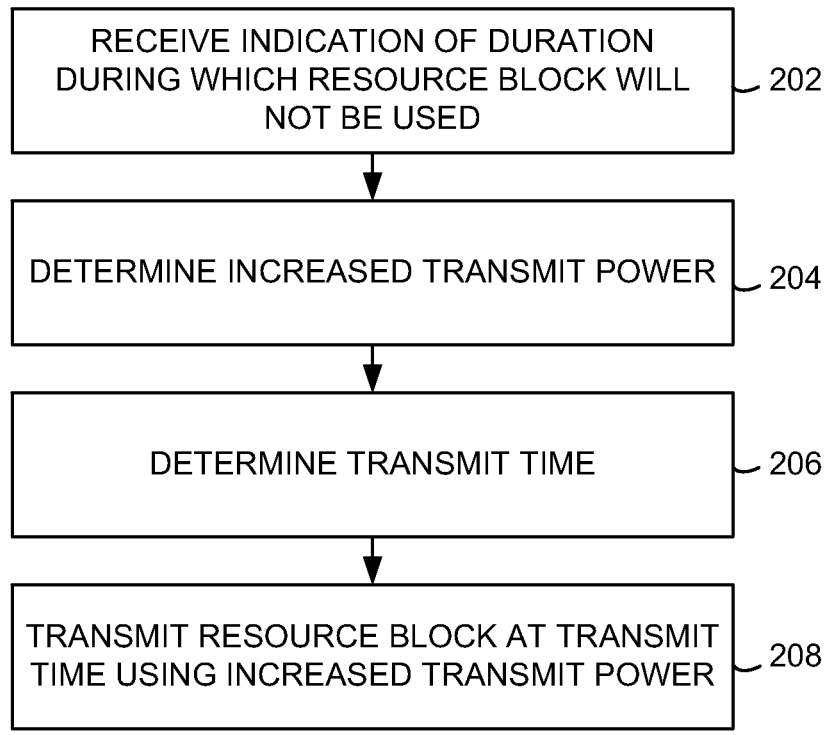
FIG. 2 illustrates an exemplary method of transmitting information to a wireless device.

FIG. 2 illustrates an exemplary method of transmitting information to a wireless device. An indication is received at a first access node (such as access node 104) from a second access node (such as access node 106) of a duration during which a resource block will not be used by the second access node (operation 202). The indication can be received over a communication link between the first and second access nodes (for example, communication link 112). The duration can comprise a duration of time starting at a specified point in the future. The duration can indicate a length of time in variety of ways, such as a length of time in milliseconds, or such as a length of time required to transmit one or more resource blocks, frames, etc. In an embodiment, the duration comprises an indication of one or more time to transmit intervals (TTIs) during which a resource block will not be used by access node 106.

In operation 204, an increased transmit power at the first access node for the resource block is determined. The increased transmit power can be determined based on unused transmission resources at access node 104. Additionally, or alternatively, the indication received from access node 106 can also comprise a threshold transmit power to indicate a maximum permissible increased transmit power for access node 104.

When the increased transmit power is determined, a transmit time to transmit the resource block from access node 104 is determined (operation 206). Because the indication is received from access node 106 over communication link 112, any delay in transmission of the indication, or any delay induced in transit over communication link 112, can affect the determination of the transmit time of the resource block, and the transmit time can be precisely determined to occur within the duration.

Using the increased transmit power, the resource block is transmitted from access node 104 at the transmit time (operation 208). The transmit time corresponds with the duration, and so the robustness of a signal comprising the transmitted resource block can be increased from access node 104 while avoiding causing interference with a signal from neighboring access node 106.

Figure 3:
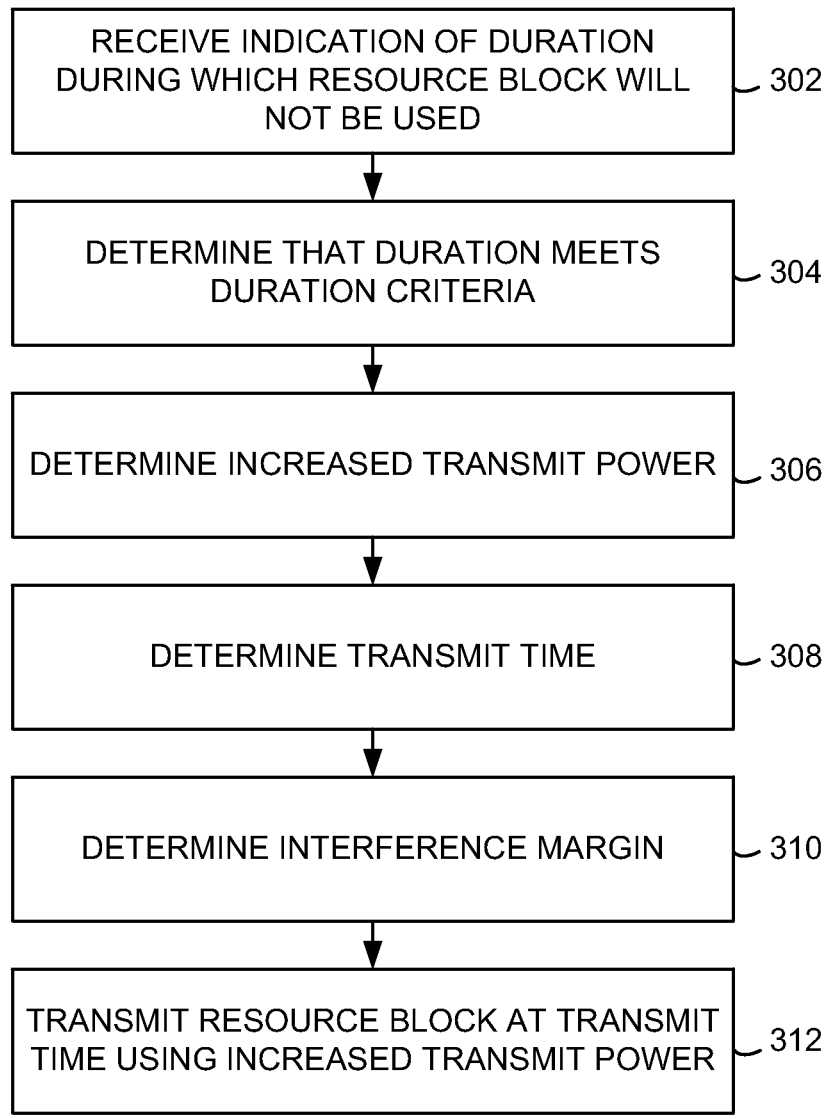
FIG. 3 illustrates another exemplary method of transmitting information to a wireless device.

FIG. 3 illustrates another exemplary method of transmitting information to a wireless device. In operation 302, an indication is received at a first access node (access node 104) from a second access node (access node 106) of a duration during which a resource block will not be used by the second access node. The indication can be received over a communication link between the first and second access nodes (for example, communication link 112). The duration can comprise a duration of time starting at a specified point in the future. The duration can indicate a length of time in variety of ways, such as a length of time (e.g., in milliseconds), or such as a length of time required to transmit one or more resource blocks, frames, etc. In an embodiment, the duration comprises an indication of one or more time to transmit intervals (TTIs) during which a resource block will not be used by access node 106.

In operation 304, it is determined that the duration during which the resource block will not be used by the second access node meets a duration criteria. For example, the length of time of the duration, or the number of resource elements or resource blocks of the duration, is evaluated to determine whether access node 104 is capable of transmitting the resource block. When the duration is sufficiently long for access node 104 to transmit the resource block, then the duration can be determined to meet the duration criteria.

An increased transmit power at the first access node for the resource block is then determined (operation 306). The increased transmit power can be determined based on unused transmission resources at access node 104. Additionally, or alternatively, the indication received from access node 106 can also comprise a threshold transmit power to indicate a maximum permissible increased transmit power for access node 104.

When the increased transmit power is determined, a transmit time to transmit the resource block from access node 104 is determined (operation 308). Because the indication is received from access node 106 over communication link 112, any delay in transmission of the indication, or any delay induced in transit over communication link 112, can affect the determination of the transmit time of the resource block. Accordingly, an interference margin can be determined (operation 310). The interference margin time can occur either at the beginning or the end of the duration, or at both the beginning and the end of the duration. The transmit time can be determined to occur within the duration and to avoid the interference margin time. In an embodiment, the indication from access node 106 further comprises an interference margin time, to provide a buffer of time within the duration. The interference margin time can be indicated as a length of time (e.g., in milliseconds), or as a length of time required to transmit one or more resource blocks, frames, TTIs, and the like In operation 312, using the increased transmit power, the resource block is transmitted from access node 104 at the transmit time. The transmit time corresponds with the duration, and does not correspond with the interference margin time. Thus, the robustness of a signal comprising the transmitted resource block can be increased from access node 104 while avoiding causing interference with a signal from neighboring access node 106.

In an embodiment, it may also be determined that the second access node has not requested that the first access node stop transmitting using the increased transmit power. For example, access node 106 may provide to access node 104, as part of the indication, together with the indication, or as a separate message, a request that access node 104 stop transmission using the increased transmit power. An example of such as stop request can comprise an RB_Flag or similar indication sent by access node 106 to access node 104. When the increased transmit power meets a transmit power criteria and the second access node has not requested that the first access node stop transmitting using the increased transmit power, the first access node can transmit the resource block during the duration using the increased transmit power.

Figure 4:
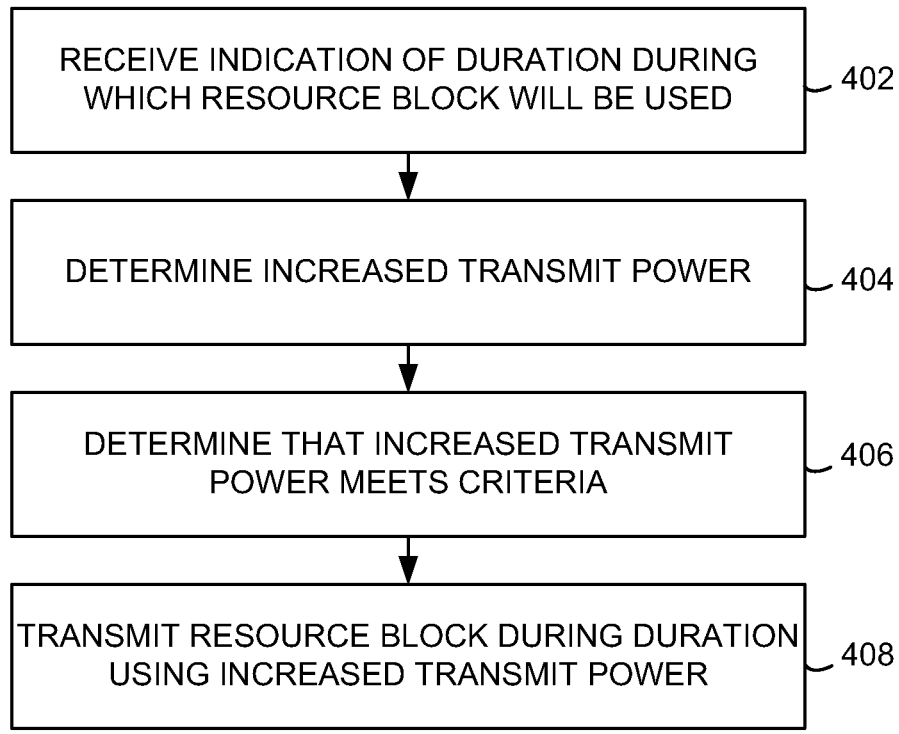
FIG. 4 illustrates another exemplary method of transmitting information to a wireless device.

FIG. 4 illustrates another exemplary method of transmitting information to a wireless device. In operation 402, an indication is received at a first access node (such as access node 104) from a second access node (such as access node 106) of a duration during which a resource block will be used by the second access node. The indication can be received over a communication link between the first and second access nodes (for example, communication link 112). The duration can comprise a duration of time starting at a specified point in the future during which the resource block will be used by access node 106. The duration can indicate a length of time in variety of ways, such as a length of time in milliseconds, or such as a length of time required to transmit one or more resource blocks, frames, etc. In an embodiment, the duration comprises an indication of one or more time to transmit intervals (TTIs) during which a resource block will be used by access node 106.

An increased transmit power at the first access node for the resource block is determined (operation 404). The increased transmit power can be determined based on unused transmission resources at access node 104. Additionally, or alternatively, the indication received from access node 106 can also comprise a threshold transmit power to indicate a maximum permissible increased transmit power for access node 104.

It is also determined that the increased transmit power meets a transmit power criteria (operation 406). For example, the indication received from access node 106 can comprise a threshold interference level, beyond which transmission of a signal by access node 106 will be intolerably affected by a transmission from access node 104. When the increased transmit power will not intolerably interfere with the transmission from access node 106, it can be determined that the increased transmit power meets the transmit power criteria.

When the increased transmit power is determined, and it is determined that the increased transmit power meets a transmit power criteria, the resource block is transmitted from the first access node using the increased transmit power (operation 408). When the increased transmit power meets a transmit power criteria, the robustness of a signal comprising the transmitted resource block can be increased from access node 104 by using the increased transmit power while avoiding causing interference with a signal from neighboring access node 106.

Figure 5:
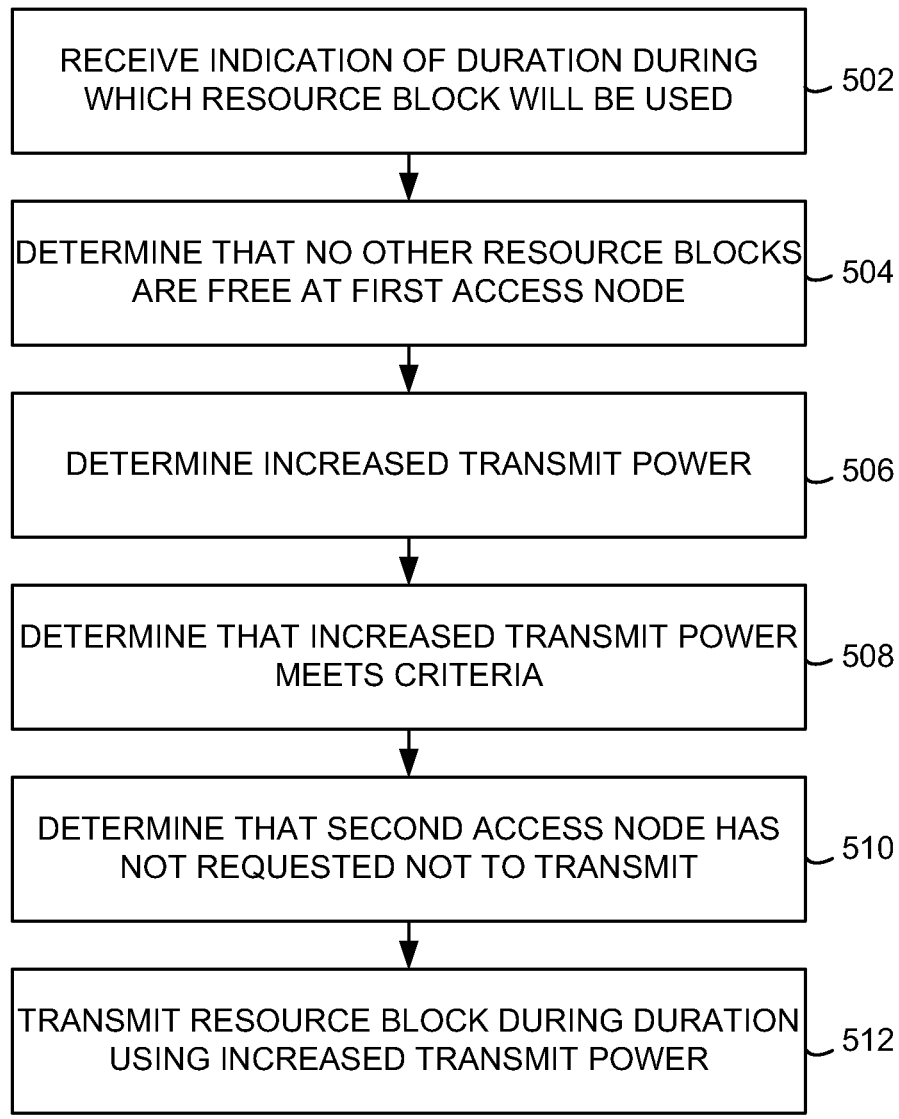
FIG. 5 illustrates another exemplary method of transmitting information to a wireless device.

FIG. 5 illustrates another exemplary method of transmitting information to a wireless device. An indication is received at a first access node (access node 104) from a second access node (access node 106) of a duration during which a resource block will be used by the second access node (operation 502). The indication can be received over a communication link between the first and second access nodes (for example, communication link 112). The duration can comprise a duration of time starting at a specified point in the future during which the resource block will be used by access node 106. The duration can indicate a length of time in variety of ways, such as a length of time in milliseconds, or such as a length of time required to transmit one or more resource blocks, frames, etc. In an embodiment, the duration comprises an indication of one or more time to transmit intervals (TTIs) during which a resource block will be used by access node 106. The resource block can further comprise a bearer data resource block. That is, the resource block to which the increased transmit power will be applied may not be a reference signal resource element or a control channel resource element, but rather may be a resource block allocated to convey bearer data. In an embodiment, the bearer data can be non-guaranteed bit rate bearer data.

In operation 504, it is determined that no other resource blocks are free at access node 104. In other words, no other resource blocks are available at access node 104, for example, because they are already allocated to transmit information, and access node 104 must use a resource block which may potentially interfere with a signal transmitted from a neighboring access node (access node 106).

An increased transmit power at the first access node for the resource block is then determined (operation 506). The increased transmit power can be determined based on unused transmission resources at access node 104. Additionally, or alternatively, the indication received from access node 106 can also comprise a threshold transmit power to indicate a maximum permissible increased transmit power for access node 104.

In operation 508, it is determined that the increased transmit power meets a transmit power criteria. For example, the indication received from access node 106 can comprise a threshold interference level, beyond which transmission of a signal by access node 106 will be intolerably affected by a transmission from access node 104. When the increased transmit power will not intolerably interfere with the transmission from access node 106, it can be determined that the increased transmit power meets the transmit power criteria.

It is then determined that the second access node has not requested that the first access node stop transmitting using the increased transmit power (operation 510). For example, access node 106 may provide to access node 104, as part of the indication, together with the indication, or as a separate message, a request that access node 104 stop transmission using the increased transmit power. An example of such as stop request can comprise an RB_Flag or similar indication sent by access node 106 to access node 104.

When the increased transmit power is determined, and it is determined that the increased transmit power meets a transmit power criteria, the resource block is transmitted from the first access node using the increased transmit power (operation 512). When the increased transmit power meets the transmit power criteria, the robustness of a signal comprising the transmitted resource block can be increased from access node 104 by using the increased transmit power while avoiding causing interference with a signal from neighboring access node 106.

Figure 6:
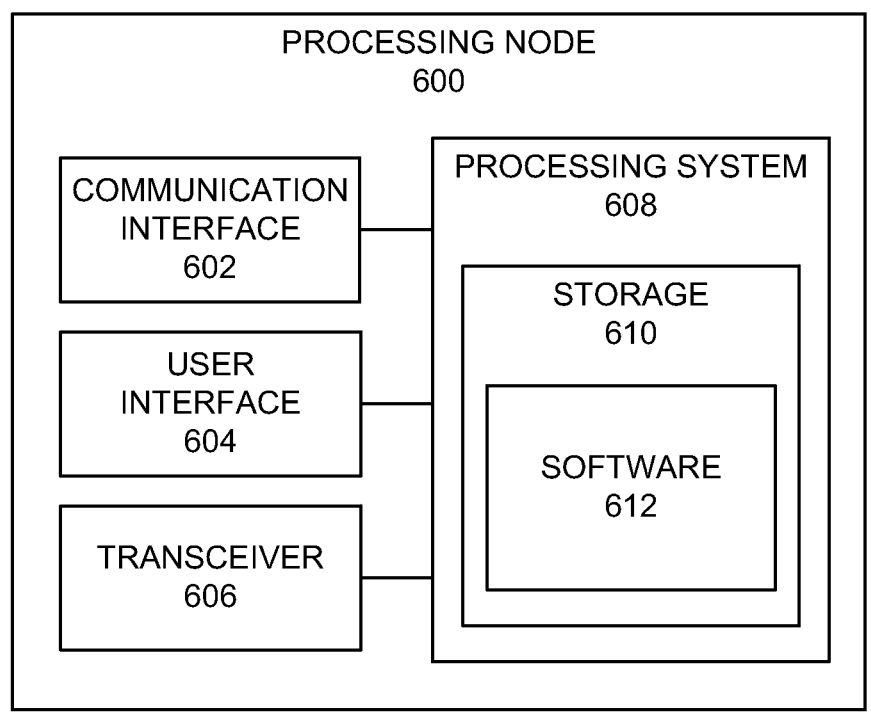
FIG. 6 illustrates an exemplary processing node.

FIG. 6 illustrates an exemplary processing node 600 in a communication system comprising communication interface 602, user interface 604, and processing system 606 in communication with communication interface 602 and user interface 604. Processing node 600 can be configured to determine an increased transmit power for a resource block at an access node and perform additional related functions. Processing system 606 includes storage 608, which can comprise a disk drive, flash drive, memory circuitry, or other memory device. Storage 608 can store software 610 which is used in the operation of the processing node 600. Storage 608 may include a disk drive, flash drive, data storage circuitry, or some other memory apparatus. Software 610 may include computer programs, firmware, or some other form of machine-readable instructions, including an operating system, utilities, drivers, network interfaces, applications, or some other type of software. Processing system 606 may include a microprocessor and other circuitry to retrieve and execute software 610 from storage 608. Processing node 600 may further include other components such as a power management unit, a control interface unit, etc., which are omitted for clarity. Communication interface 602 permits processing node 600 to communicate with other network elements. User interface 604 permits the configuration and control of the operation of processing node 600.

Examples of processing node 600 include access node 104 and access node 106. Processing node 600 can also be an adjunct or component of a network element, such as an element of access node 104 or access node 106. Processing node 600 can also be another network element in a communication system. Further, the functionality of processing node 600 can be distributed over two or more network elements of a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention, and that various modifications may be made to the configuration and methodology of the exemplary embodiments disclosed herein without departing from the scope of the present teachings. Those skilled in the art also will appreciate that various features disclosed with respect to one exemplary embodiment herein may be used in combination with other exemplary embodiments with appropriate modifications, even if such combinations are not explicitly disclosed herein. As a result, the invention is not limited to the specific embodiments described above, but only by the following claims and their equivalents.

What is claimed is:

1. A method of transmitting information to a wireless device, comprising:
   receiving at a first access node from a second access node over a communication link between the first and second access nodes information comprising an indication of a duration during which a resource block will not be used by the second access node and an interference margin time which is within the duration and which occurs during at least one of the beginning and the end of the duration;
   determining an increased transmit power at the first access node for the resource block;
   determining a transmit time at the first access node for the resource block; and
   transmitting the resource block from the first access node at the transmit time using the increased transmit power when the transmit time corresponds with the duration and when the transmit time does not correspond with the interference margin time.

2. The method of claim 1, wherein the interference margin time further comprises one or more time-resource intervals.

3. The method of claim 2, wherein the interference margin time further comprises one or more time transmission intervals (TTIs).

4. The method of claim 1, further comprising determining that the duration during which the resource block will not be used by the second access node meets a duration criteria.

5. The method of claim 1, further comprising determining that the second access node has not requested that the first access node stop transmitting using the increased transmit power.

6. The method of claim 1, further comprising transmitting the resource block from the first access node during the duration using the increased transmit power when the increased transmit power meets a transmit power criteria and the second access node has not requested that the first access node stop transmitting using the increased transmit power.

7. A method of transmitting information to a wireless device, comprising:
   receiving at a first access node from a second access node information comprising an indication of a duration during which a resource block will be used by the second access node, wherein the resource block comprises a non-guaranteed bit rate bearer data resource block;
   determining an increased transmit power at the first access node for the resource block;
   determining at the first access node that there are no free resource blocks other than the resource block; and
   transmitting the resource block from the first access node during the duration using the increased transmit power when the increased transmit power meets a transmit power criteria and when there are no free resource blocks other than the resource block at the first access node.

8. The method of claim 7, further comprising transmitting the resource block from the first access node during the duration using the increased transmit power when the increased transmit power meets a transmit power criteria and the second access node has not requested that the first access node stop transmitting using the increased transmit power.

9. The method of claim 7, wherein the transmit power criteria comprises a transmit power at which the resource block transmitted from the first access does not interfere with the resource block transmitted from the second access node.

10. A network element for transmitting information to a wireless device, comprising:
 an interface configured to receive from a second access node information comprising an indication of whether a resource block will be used by the second access node during a duration, wherein the information from the second access node further comprises an interference margin time which within the duration and occurs during at least one of the beginning and the end of the duration;
 a processor configured to determine a transmit time at the first access node for the resource block; and
 a transceiver configured to transmit the resource block from the first access node at the transmit time using an increased transmit power when the transmit time corresponds with the duration and when the transmit time does not correspond with the interference margin time.

11. The network element of claim 10, wherein the interference margin time further comprises one or more time-resource intervals.

12. The network element of claim 11, wherein the interference margin time further comprises one or more time transmission intervals (TTIs).

13. The network element of claim 10, wherein the processor is further configured to determine that the duration during which the resource block will not be used by the second access node meets a duration criteria.

* * * * *